Nov. 18, 1941.　　　　R. PASCOE　　　　2,263,188
DUAL FRONT WHEEL MOUNTING
Filed April 3, 1941
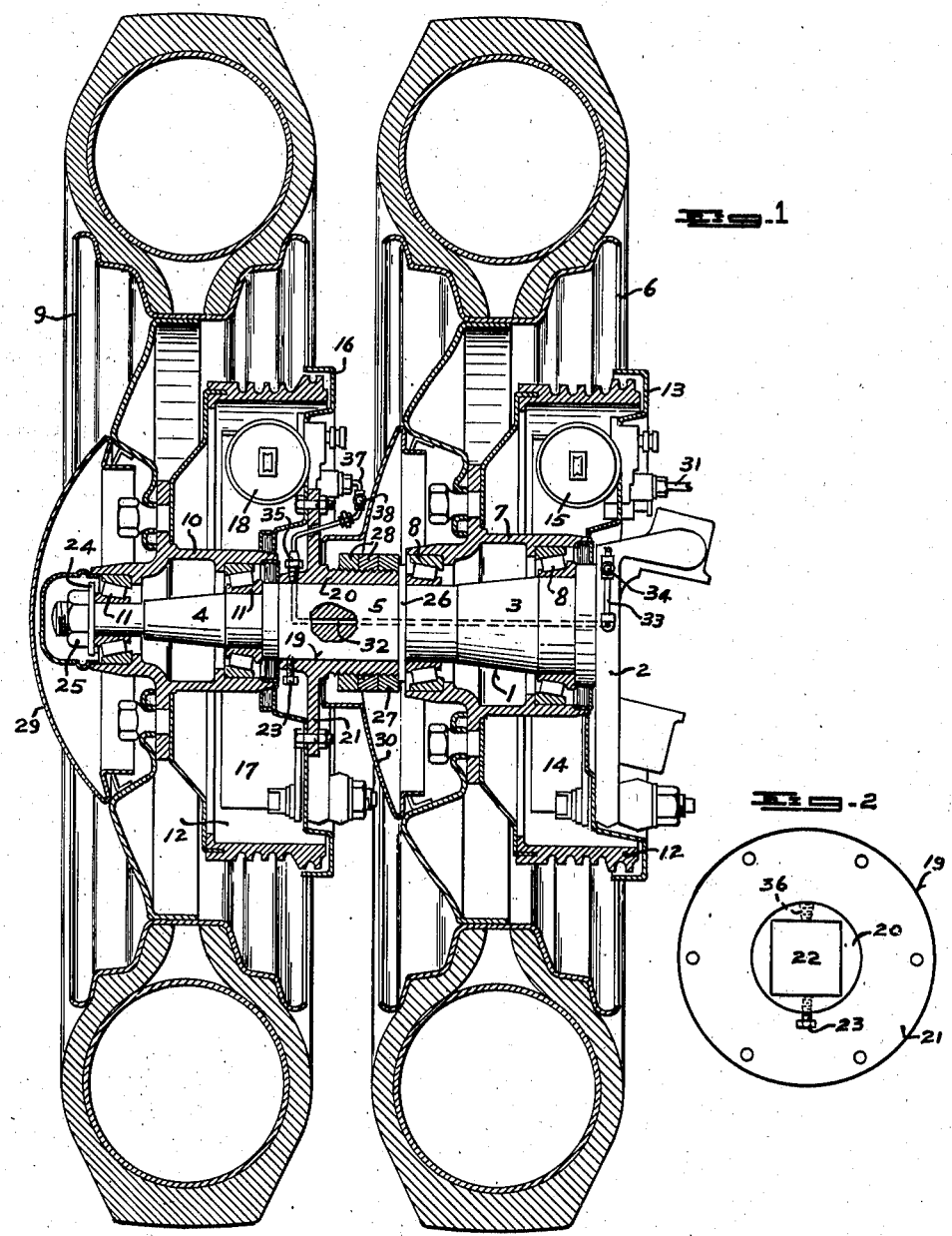
INVENTOR
Richard Pascoe
BY
Jack R Snyder
ATTORNEY Patented Nov. 18, 1941

2,263,188

UNITED STATES PATENT OFFICE 2,263,188

DUAL FRONT WHEEL MOUNTING

Richard Pascoe, Pittsburgh, Pa.

Application April 3, 1941, Serial No. 386,585

3 Claims. (Cl. 188—18)

This invention relates to a dual front wheel mounting for a motor vehicle, and while primarily designed and intended for use on trucks, busses, vans and other commercial vehicles, it will be obvious that the improved mounting may be employed in connection with any other types of motorized vehicles wherein it is found to be applicable.

The invention contemplates among its important objects and advantages to provide a dual front wheel mounting of the character described, which affords added safety by sustaining in the operative condition the equipped vehicle in the event of damage to either of the associated wheels and tires, which embodies a pair of independently revoluble wheels and an independently operable brake mechanism for each of the latter, which functions automatically to differentiate wheel movements when traversing short turns, which allows more equable distribution and proper balance of the vehicle load and thereby facilitates the control and steerability of the vehicle, which involves no substantial departure from the conventional types of wheel construction and brake mechanism, which is simple in its arrangement, durable and efficient in its use, compact, and comparatively economical in its manufacture, installation and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claims hereunto appended.

In the drawing wherein like numerals of reference designate corresponding parts through the several views:

Figure 1 is a vertical cross sectional view of a dual wheel assembly constructed and arranged in accordance with the invention.

Figure 2 is an outer end view of the supporting spider embodied in the present invention.

Referring in detail to the drawing the improved dual front wheel assembly comprises an integral, elongated spindle structure 1, which carries a conventional type of steering knuckle 2, formed integral with the inner end thereof. The spindle structure is formed to provide an inner spindle 3, an outer spindle 4, and an intermediate spindle portion 5, which latter is square in transverse cross section and disposed between the spindles 3 and 4.

An inner wheel 6 is demountably secured to its hub 7, which latter is revolubly mounted on the inner spindle 3 by a pair of roller bearings 8. In like manner an outer wheel 9 is demountably secured to its hub 10, which is journalled for rotation on the outer spindle 4 by a pair of roller bearings 11. Each of the wheels 6 and 9 is provided with a fixed, conventional type of brake drum 12 carried by the respective hubs 7 and 10.

The brake mechanism of the inner wheel 6 comprises the brake support 13, the brake shoes 14 and the operating cylinder 15, and is supported by the steering knuckle 2 in the usual manner. However, the brake mechanism of the outer wheel 9, comprising the brake support 16, the brake shoes 17 and the operating cylinder 18, is carried by a special supporting spider 19, which latter form an important feature of the present invention. The brake mechanisms of the wheels 6 and 9 are generally of the conventional types of hydraulically operated and controlled brakes now in universal use on motorized vehicles.

The supporting spider 19 comprises a hub 20 and an integral circular flange 21. The latter is disposed intermediate of and spaced from the respective ends of said hub 20. The hub 20 is formed with a square bore 22 and has a fixed press fit on the square spindle portion 5 of the spindle structure 1. The spider 19 is removable from the latter, and is further locked in its mounted position by means of a locking bolt 23, which is engaged in the outer portion of the hub 20 and in a recess provided therefor in the adjacent face of the spindle portion 5. It is, of course, apparent that the spider 19 may be removably secured to the spindle structure 1 by a keyed interengagement, or by a screw thread connection, or in any other suitable manner to best meet conditions found in practice, without departing from the spirit of the invention. The spider 19 carries the entire brake mechanism of the outer wheel 9 by its connection with the brake support 16 of said mechanism to the flange 21 of the spider.

A thrust washer 24 and bearing nut 25 are mounted and engaged on the free outer end of the spindle 4 in the usual manner for revolubly attaching the outer wheel 9 in position to the latter. The inner wheel 6 is revolubly attached in position on its spindle 3 by a thrust washer 26 and a bearing nut 27. The thrust washer 26 is disposed at the outer end of the spindle 3 and engages the outer roller bearing 8 of the inner wheel. The periphery of the inner portion of the spider hub 20 is threaded, and the bearing nut 27 is engaged thereon to act against the thrust washer 26 in the usual manner. The bearing nut 27 is secured in the adjusted position by a pair of lock nuts 28 likewise engaged on the threaded inner portion of the spider hub 20, as clearly shown in the drawing.

The outer wheel 9 carries a hub cap 29 of the usual construction, but the inner wheel 6 is provided with a special hub cap 30 having a centrally disposed opening for the passage of the spider hub 20 therethrough.

Operating fluid from the hydraulic braking system of the vehicle is supplied to the brake cylinder 15 of the inner wheel brake mechanism through a joined fluid supply pipe 31 in the usual manner. However, the operating fluid is supplied to the brake cylinder 18 of the outer wheel brake mechanism through a special passage 32 formed in the spindle structure 1. The inner end of the passage 32 communicates with a fluid supply pipe 33, which is supported with a suitable fitting by the steering knuckle 2. The supply pipe 32 is provided with a control valve 34 operable for opening or closing the supply pipe 33 when required.

The outer end of the fluid passage 32 communicates with a seated coupling 35 having screw thread engagement in an aperture 36 formed in the outer portion of the hub 20 of the spider 19. A fluid supply pipe 37 provided with a control valve 38, connects the coupling 35 with the brake cylinder 18 of the outer wheel brake mechanism. It is, of course, evident that the operating fluid from the vehicle braking system may be supplied to the brake cylinder 18 in any other suitable manner instead of conveying same through a passage in the spindle structure in the manner stated.

It will be noted that, apart from the embodiment of the supporting spider 19 with its associated parts and the conveyance of the operating fluid through a passage in the spindle structure, the wheels together with their brake mechanisms are uniformly similar in construction and arrangement and generally involve no material or mechanical departure from the conventional practice or fixed usages in the art to which the invention appertains.

The outer wheel 9 may be readily removed in the usual manner, but to remove the inner wheel 6 it is necessary to close the valves 34 and 38, and disconnect the pipe 37, and release the outer wheel brake mechanism from the spider 19. If the flange diameter of the spider is less than the wheel hub opening, the wheel may be removed without pulling the spider, and if not, it would be necessary to also remove the spider to allow the removal of the inner wheel.

The particular and most important feature of the present disclosure resides in the provision of a dual front wheel assembly for motor vehicles in which the wheels are mounted to rotate independently of each other, and in which each of the wheels embodies an independently operable brake mechanism.

From the foregoing description taken in connection with the accompanying drawing, the construction of the invention and the method of its operation will be readily apparent to those skilled in the art to which the invention appertains, and while illustrating and describing an operable embodiment of the invention, it is to be understood that changes in the details of construction may be resorted to that come within the scope of the appended claims.

What I claim is:

1. In a dual wheel assembly of the character described, the combination of an integral spindle structure formed to provide an inner spindle an outer spindle and an intermediate spindle portion, an inner wheel, an outer wheel, a pair of roller bearings supporting each of said wheels for free relative rotation on respective spindles, an independent fluid operated brake mechanism for each of said wheels respectively disposed at the inner sides of the latter, a spider including a flange and a hub mounted on said intermediate spindle portion, the brake mechanism of said outer wheel being carried by said flange intermediate of said wheels, and means engaged in said hub for adjustably securing said spider on said spindle portion.

2. In a dual wheel assembly of the character described, the combination of an integral spindle structure formed to provide an inner spindle, and outer spindle and an intermediate spindle portion, an inner wheel, an outer wheel, a pair of roller bearings supporting each of said wheels for free relative rotation on respective spindles, an independent fluid operated brake mechanism for each of the wheels respectively disposed at the inner sides of the latter, a spider including a circular flange and a hub mounted on said intermediate spindle portion, the brake mechanism of said outer wheel being carried by said flange intermediate of said wheels, means engaged in said hub for adjustably securing said spider on said spindle portion, and means carried by said hub operable for adjusting the bearings of said inner wheel.

3. In a dual wheel assembly of the character described, the combination of an integral spindle structure formed to provide an inner spindle and outer spindle and an intermediate spindle portion, an inner wheel, an outer wheel, a pair of roller bearings supporting each of said wheels for free relative rotation on respective spindles, an independent fluid operated brake mechanism for each of the wheels respectively disposed at the inner sides of the latter, a spider including a circular flange and a hub mounted on said intermediate spindle portion, the brake mechanism of said outer wheel being carried by said flange intermediate of said wheels, means engaged in said hub for adjustably securing said spider on said spindle portion, means carried by said hub operable for adjusting the bearings of said inner wheel, and means formed in said structure and extending through said hub for conveying the operating fluid to the brake mechanism of said outer wheel.

RICHARD PASCOE.